United States Patent
Haldar

(10) Patent No.: US 11,782,933 B2
(45) Date of Patent: **\*Oct. 10, 2023**

(54) SEARCH RESULT OPTIMIZATION USING MACHINE LEARNING MODELS

(71) Applicant: Airbnb, Inc., San Francisco, CA (US)

(72) Inventor: Malay Haldar, Foster City, CA (US)

(73) Assignee: Airbnb, Inc., San Francisco, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/382,837

(22) Filed: Jul. 22, 2021

(65) Prior Publication Data

US 2021/0349908 A1  Nov. 11, 2021

Related U.S. Application Data

(63) Continuation of application No. 16/441,952, filed on Jun. 14, 2019, now Pat. No. 11,100,117.

(51) Int. Cl.
| | |
|---|---|
| *G06F 16/2457* | (2019.01) |
| *G06F 16/248* | (2019.01) |
| *G06N 3/04* | (2023.01) |
| *G06N 3/08* | (2023.01) |
| *G06N 3/045* | (2023.01) |

(52) U.S. Cl.
CPC ...... *G06F 16/24578* (2019.01); *G06F 16/248* (2019.01); *G06N 3/045* (2023.01); *G06N 3/08* (2013.01)

(58) Field of Classification Search
CPC .............. G06F 16/9535; G06F 16/248; G06F 16/24578; G06N 3/08; G06N 3/045
See application file for complete search history.

(56) References Cited

U.S. PATENT DOCUMENTS

| | | | |
|---|---|---|---|
| 2012/0158685 A1* | 6/2012 | White | G06F 16/9535 707/723 |
| 2013/0254176 A1 | 9/2013 | Davlos | |
| 2016/0055203 A1* | 2/2016 | Shi | H04L 67/02 707/769 |

(Continued)

OTHER PUBLICATIONS

"U.S. Appl. No. 16/441,952, Notice of Allowance dated Apr. 21, 2021", 9 pgs.

*Primary Examiner* — Etienne P Leroux
(74) *Attorney, Agent, or Firm* — Schwegman Lundberg Woessner, P.A.

(57) ABSTRACT

Systems and methods are provided for search result optimization using machine learning models. A search system uses machine learning models generate a target vector based on query features of a search query and a set of listing vectors based on listing features of listings identified as part of the search query. The target vector represents an estimated optimal listing for the search query and each listing vector represents a corresponding listing identified as part of the search query. The search system determines distances (e.g., Euclidian distance) between each listing vector and the target vector. The determined distances indicate how similar each listing is to the estimated optimal listing for the search query. The search system ranks the listings based on the distances such that listings that are similar to the estimated optimal listing are ranked higher than listing that are not similar to the estimated optimal listing.

20 Claims, 7 Drawing Sheets

(56) References Cited

U.S. PATENT DOCUMENTS

2017/0344550 A1\* 11/2017 Fischer ............. G06F 16/24578
2018/0089556 A1\* 3/2018 Zeiler ...................... G06N 3/08
2019/0026371 A1\* 1/2019 Wenzek ................ G06F 16/338
2019/0188195 A1\* 6/2019 Hurry ................. G06F 16/2291
2020/0394199 A1 12/2020 Haldar \* cited by examiner

SEARCH RESULT OPTIMIZATION USING MACHINE LEARNING MODELS

PRIORITY APPLICATIONS

This application is a continuation of U.S. patent application Ser. No. 16/441,952, filed Jun. 14, 2019, the content of which is incorporated herein by reference in its entirety.

BACKGROUND

An online marketplace may provide listings for offered services, such as accommodations, tours, transportation, and so forth. Users of the online marketplace may view the provided listings and reserve or "book" one or more of the listed services. For example, a listing user (e.g., host, manager) can post a listing to the online marketplace for one or more services offered by the listing user. A client user (e.g., guest) may then view the posted listing and book the offered service if desired. To aid users in finding listings that are relevant to the user's needs, the online marketplace may enable the users to search the listings based on search parameters provided by the user. For example, a user may provide search parameters such as defining a particular location for the services (e.g., San Francisco), desired dates (e.g., 6/10-6/17), type of service needed (e.g., house rental, car rental, tour), and so forth. The online marketplace uses the provided search parameters to identify relevant listings, which are presented to the user. In many instance, however, the number of identified listings is relatively high, and therefore a user may still have difficulty finding listings that best suit the user's specific needs.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
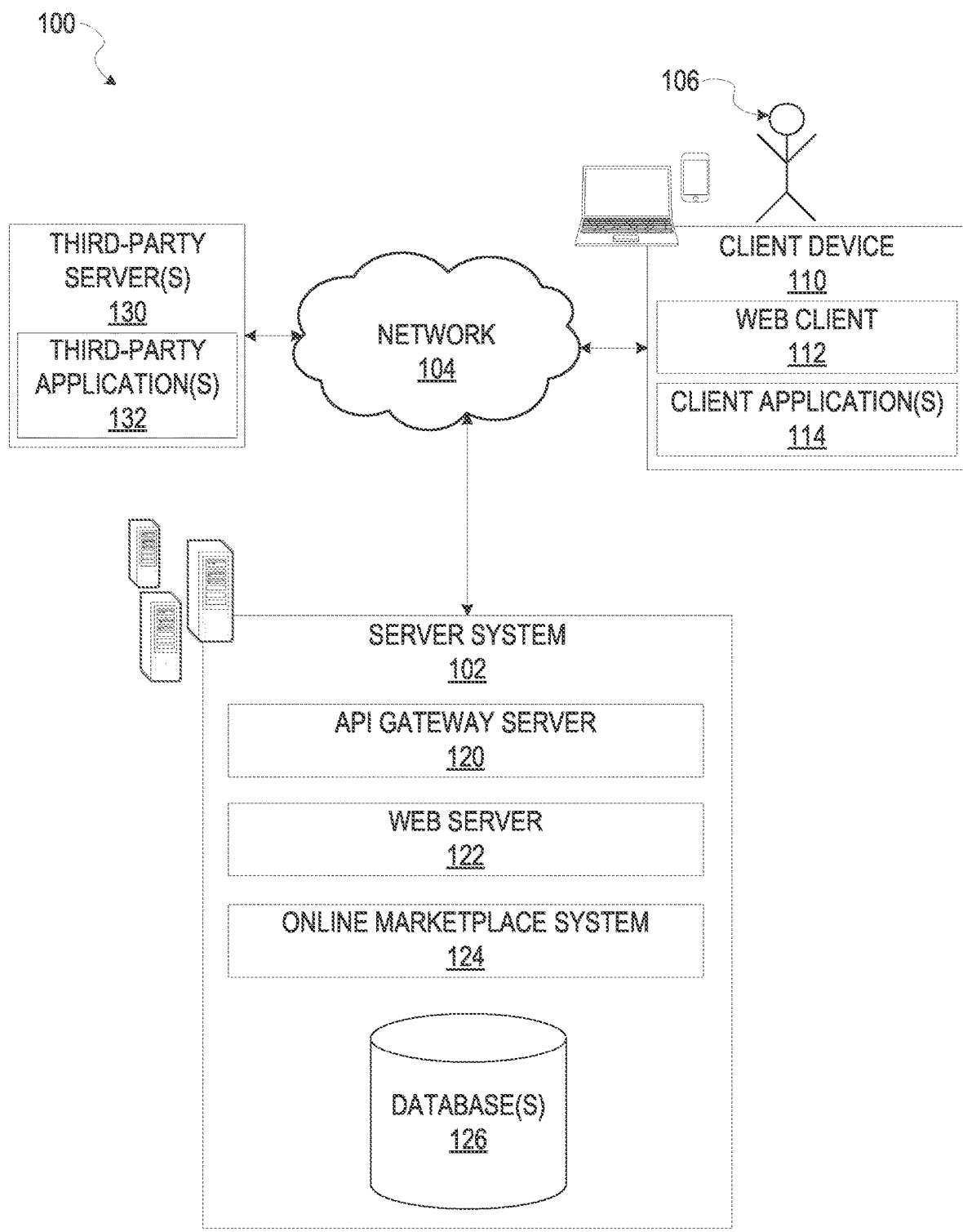
FIG. 1 is a block diagram illustrating a networked system, according to some example embodiments.

Systems and methods described herein relate to search result optimization using machine learning models. An online marketplace system may host an online marketplace that includes listings posted to the online marketplace by listing users (e.g., hosts, suppliers, managers, owners) for services offered by the listing users. For example, the listings may describe the services offered by the listing users, such as accommodations, tours, transportation, and so forth. Client users (e.g., guest, clients) may use the online marketplace system to view the posted listings and reserve or "book" one or more of the listed services. For example, the listings may describe accommodations hosted by various listing users, such as apartments, houses, cabins, a camper, one or more rooms in an apartment or house, or the like, that can be reserved by client users. As another example, the online marketplace may provide listings for other services, such as experiences (e.g., local tours), car rental, flights, public transportation, and other transportation or activities related to travel, that can be booked by client users.

A listing user (e.g., host, supplier, manager, owner) is a user or entity that has created an account with the online marketplace system to post a listing to the online marketplace that offers a particular service (e.g., accommodation, tour, transportation option). A client user (e.g., guest, clients) is a user of the online marketplace system that is interested, views, purchases, and/or reserves a particular service provided by listings posted to the online marketplace. A listing user and client user are not necessarily exclusive, as a listing user that has created an account with the online marketplace system to post listings to the online marketplace may also be a client user that is interested, views, purchases, and/or reserves a particular service provided by listings posted to the online marketplace.

Each listing posted to the online marketplace is associated with a number of listing features that describe the listing and/or service offered by the listing. For example, listing features that describe the provided services may include a price to purchase and/or reserve the provided service, one or more fees (e.g., cleaning fee, additional guest fee, etc.) associated with purchasing and/or reserving the provided service, discounts associated with the service, a number of bedrooms or beds, a percentage of time that the service is booked or occupied, a geographic location associated with the provided, service, etc. Listing features that describe the listing services may include a listing view (e.g., number of views by client users), a number of images included in the listing, an amount of descriptive data provided in the listing, a popularity rank of the listing, etc.

To aid client users in finding listings that are relevant to the user's needs, the online marketplace system may use the functionality of a search system that enables client users to search the listings posted to the online marketplace based on search parameters provided by the client users. For example, a client user may provide search parameters such as defining a particular location for the services (e.g., San Francisco), desired dates that the service is needed (e.g., 6/10-6/17), the type of service needed (e.g., house rental, car rental, tour), a desired price range for the services, and so forth. The search system uses the provided search parameters to execute a search query in which the search system identifies listings posted to the online marketplace that meet the client user's provided search parameters. For example, the search system may identify listings providing services that are within the specified geographic location, are offered within the specified price range, include a specified number of rooms, and so forth.

Just as each listing is associated with a number of listing features, each search query is similarly associated with a number of query features that describe the search query and/or the client user that caused execution of the search query. For example, the query features may include the search parameters of the search query, such as a specified, location, price range, dates, type of service, and so forth. The query features may also include data describing the client user, such as the location, age, sex, income, and so forth, of the client user, as well as historical purchase and/or reservation data of the client user, such as data describing previous listings that the client user purchased and/or reserved (e.g., price ranges, listing features).

To further aid client users in finding relevant listings, the search system ranks the listings identified during a search query based on an estimated relevance of the listings to the client user. For example, the search system may rank the listings so that the listings estimated to be of higher relevance to the client user are listed higher in the ranking, whereas the listings estimated to be of lower relevance to the client user are listed lower in the ranking. The online marketplace system may present the identified listings to the client user based on the ranking. As a result, the listings that are estimated to be of higher relevance to the client user will be presented before listings estimated to be of lower relevance to the requesting user.

One technical issue with ranking listings is how to properly account for varying query features. In many cases, determining the relevancy of a listing may vary based on the selected geographic region, the selected date, the client user, and so forth. For example, the cost associated with an acceptable accommodation (e.g., hotel room, apartment varies based on the geographic region and the selected dates. In a high value market, such as Paris or New York, the cost for an acceptable accommodation is much higher than in a low value market such as the Philippines. Likewise, the cost of an acceptable accommodation varies based on whether it is a high season or low season.

Current systems often use a single algorithm when determining the relevancy of listings, regardless of variations in the query features. For example, a search algorithm may be configured to assign higher relevancy to cheaper listings (e.g., listings with a lower price) or listings in a specified price range, without considering the geographic region or dates selected. Accordingly, listings for accommodations that are not likely acceptable to the client user may be ranked higher and presented prior to accommodations that would be acceptable to the client user.

To alleviate these issues, the search system of the present disclosure uses a combination of a query feature machine learning model and a listing feature machine learning model to rank the listings identified by a search query. The query feature machine learning model generates a target vector based on query features of a search query. The target vector represents an estimated optimal search listing for the specific search query. The listing feature machine learning model generates a listing vector based on listing features of a listing. The listing vector represents the listing associated with the listing features.

To determine the ranking of a set of listings identified for a given search query, the search system determines how similar each listing is to the estimated optimal listing for the search query. To accomplish this, the search system uses the query features of the search query as input into the query feature machine learning model to generate a target vector representing the estimated optimal listing for the search query. The search system also generates listing vectors representing the listings identified by the search query. For example, the search system uses the listing features of each listing as input into the listing feature machine learning model.

The search system determines how similar a listing is to the optimal listing for the search query based on the distance (e.g., Euclidian distance) between the listing vector representing the listing and the target vector representing the estimated optimal listing for the search query. Listing vectors that are close to the target vector (e.g., the distance between the listing vector and the target vector is relatively short) represent listings that are similar to the optimal listing. Conversely, listing vectors that are far from the target vector (e.g., the distance between the listing vector and the target vector is relatively long) represent listings that are not similar to the optimal listing.

The search system ranks the listings based on the distances of the corresponding listing vectors to the target vector such that the listings corresponding to listing vectors that are closer to the target vector are ranked higher than the listings corresponding to listing vectors that are farther from the target vector. Accordingly, listings determined to be similar to the estimated optimal listing for the search query are ranked higher and presented to the client user prior to listings determined to be less similar to the estimated optimal listing for the search query. Additional details describing the functionality of the online marketplace system and the search system, including generation, training, and use of the query feature machine learning model and the listing feature machine learning model to rank listings, are described below.

FIG. 1 is a block diagram illustrating a networked system 100, according to some example embodiments. As shown, the system 100 includes a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information, accommodation information, and so forth, associated with travel. The client device 110 may also be a device of a user that is used to post and maintain a listing for a service, request and receive reservation information, guest information, and so forth. Although the system 100 is shown as including only a single client device 106, this is only for ease of explanation and is not meant to be limiting. The system 100 may include any number of client device 106.

One or more users 106 (e.g., listing user, client user) may be a person, a machine, or other means of interacting with the client device 110. In example embodiments, the user 106 may not be part of the system 100 but may interact with the system 100 via the client device 110 or other means. For instance, the user 106 may provide input (e.g., voice input, touch screen input, alphanumeric input, etc.) to the client device 110 and the input may be communicated to other entities in the system 100 (e.g., third-party servers 130, a server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third-party servers 130, the server system 102, etc.), on an as-needed basis, for data and/or processing capabilities not locally available (e.g., to access reservation or listing information, to request data, to authenticate a user 106, to verify a method of payment). Conversely, one or more client applications 114 may not be included in the client device 110, and then the client device 110 may use its web browser to access the one or more applications hosted on other entities in the system 100 (e.g., third-party servers 130, the server system 102).

The system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102.

The server system 102 may provide server-side functionality via the network 104 (e.g., the Internet or a wide area network (WAN)) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace system 123. The online marketplace system 124 may facilitate an online marketplace in which listing users may post listings for services offered by the listing users. For example, the listings may describe the services offered by the listing users, such as accommodations, tours, transportation, and so forth. Client users (e.g., guest, clients, etc.) may use the online marketplace to view the posted listings and reserve or "book" one or more of the listed services. For example, the listings may describe accommodations hosted by various listing users, such as apartments, houses, cabins, a camper, one or more rooms in an apartment or house, and the like, that can be reserved by client users. As another example, the online marketplace may provide listings for other services, such as experiences (e.g., local tours), car rental, flights, public transportation, and other transportation or activities related to travel, that can be booked by client users.

The server system 102 may include the API gateway server 120, a web server 122, and an online marketplace system 124, that may be communicatively coupled with one or more databases 126 or other forms of data store.

The one or more databases 126 may be one or more storage devices that store data related to the reservation system 124 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The online marketplace system 124 may manage resources and provide hack-end support for third-party servers 130, third-party applications 132, client applications 114, and so forth, which may include cloud-based applications. The online marketplace system 124 may facilitate an online marketplace for listed services. For example, the online marketplace system 124 may provide functionality for posting and managing listings related to services, such as accommodation listings, activity listings, etc., to the online marketplace, as well as functionality for viewing, booking and otherwise reserving the services provided by the listings posted to the online marketplace. Further details related to the online marketplace system 124 are shown in FIG. 2 and described in the accompanying text.

Figure 2:
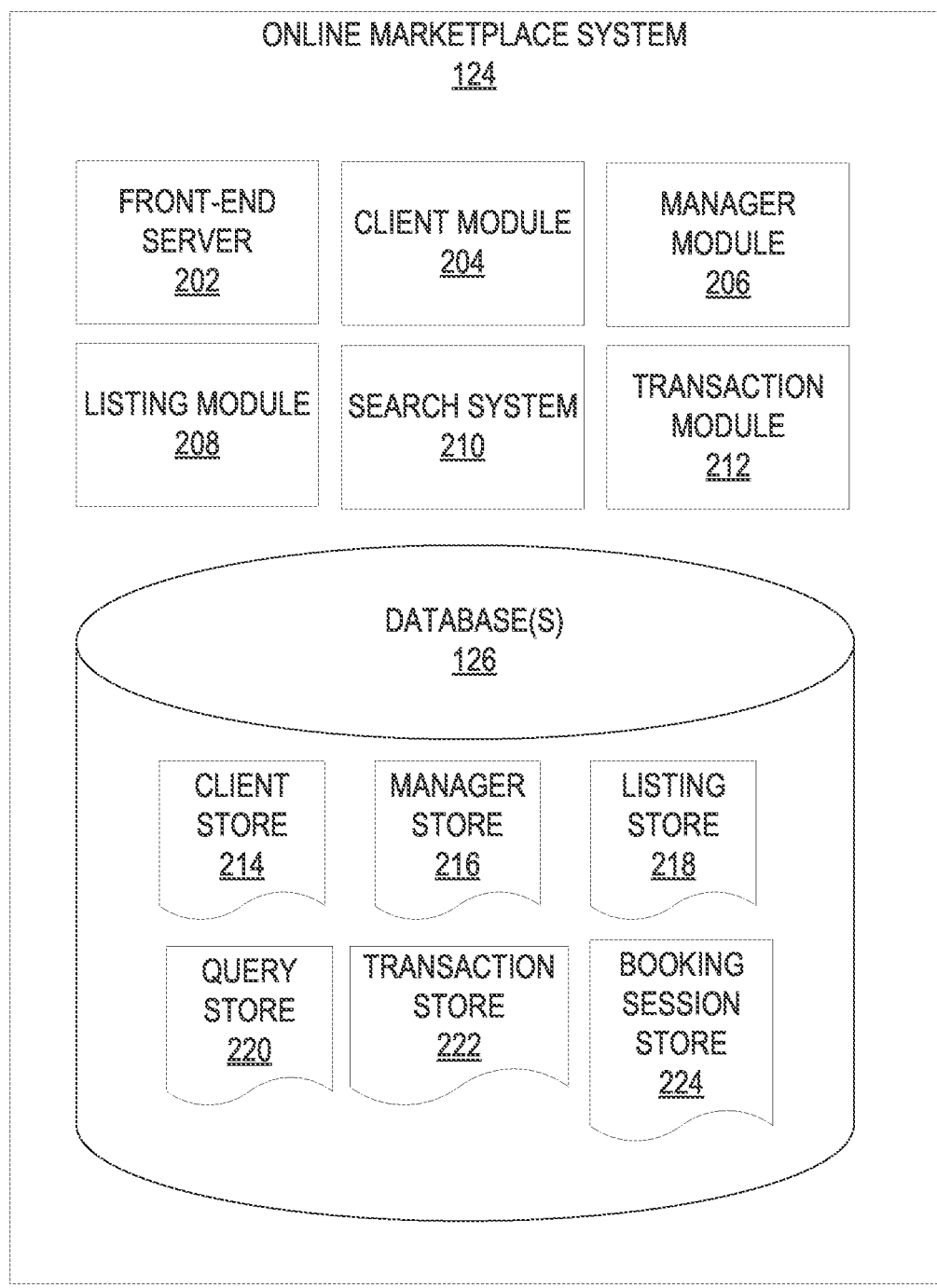
FIG. 2 is a block diagram illustrating an online marketplace system, according to some example embodiments.

FIG. 2 is a block diagram illustrating an online marketplace system 124, according to some example embodiments. The online marketplace system 124 comprises a front-end server 202, a client module 204, a manager module 206, a listing module 208, a search system 210, and a transaction module 212. The one or more database(s) 126 include a client store 214, a manager store 216, a listing store 218, a query store 220, a transaction store 222, and a booking session store 224. The online marketplace system 124 may also contain different and/or other systems or modules that are not described herein.

The online marketplace system 124 may be implemented using a single computing device or a network of computing devices, including cloud-based computer implementations. The computing devices may be server-class computers including one or more high-performance computer processors and random-access memory, which may run an operating system such as Linux or the like. The operations of the online marketplace system 124 may be controlled either through hardware or through computer programs installed in non-transitory computer-readable storage devices such as solid-state devices or magnetic storage devices and executed by the processors to perform the functions described herein.

The front-end server 202 includes program code that allows a client device 110 to communicate with the online marketplace system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents (e.g., a web browser software application), may be installed on the client device 110 and send commands to and receive data from the online marketplace system 124. The front-end server 202 may also utilize the API gateway server 120 that allows software applications installed on the client device 110 to transmit requests to the API gateway server 120 to send commands to and receive data from the online marketplace system 124. The front-end server 202 further includes program code to route commands and data to the other components of the online marketplace system 124 to carry out the processes described herein and respond to the client device 110 accordingly.

The client module 204 comprises program code that allows client users to manage their interactions with the online marketplace system 124 and executes processing logic for client user-related information that may be requested by other components of the online marketplace system 124. Each client user is represented in the online marketplace system 124 by a client object having a unique user identifier (ID) and user profile, both of which are stored in the client store 214.

The user profile includes a number of client user-related attribute fields that may include a profile picture and/or other identifying information, a geographical location, a calendar, and so forth. The client user's geographical location is either the client user's current location (e.g., based on information provided by the client device 110), or the client user's provided home address, neighborhood, city, state, or country of residence. The client user's location may be used to filter search criteria for time-expiring inventory relevant to a particular client user or to assign default language preferences.

The client module 204 provides code for a client user to set up and modify the client user's profile. The online marketplace system 124 allows each client user to exchange communications, request transactions, and perform transactions with other users (e.g., client users, listing users).

The manager module 206 comprises program code that provides a user interface that allows listing users to manage their interactions and listings with the online marketplace system 124 and executes processing logic for listing user-related information that may be requested by other components of the reservation system 124. Each listing user is represented in the reservation system 124 by a manager object having a unique listing user ID and listing user profile, both of which are stored in the manager store 216.

The listing user profile is associated with one or more listings owned or managed by the listing user and includes a number of listing user attributes including transaction requests and a set of listing calendars for each of the listings managed by the listing user.

The manager module 206 provides code for listing users to set up and modify the listing user's profile listings. A user 106 of the reservation system 124 can be both a client user and a listing user. In this case, the user 106 will have a profile entry in both the client store 214 and the manager store 216 and be represented by both a client object and a manager object. The online marketplace system 124 allows the listing users to exchange communications, respond to requests for transactions, and conduct transactions with other listing users.

The listing module 208 comprises program code enabling listing users to generate and post listings for offered services to the online marketplace facilitated by the online marketplace system 124. Once posted, the listings can be booked, purchased and/or otherwise reserved by client users. The listing module 208 is configured to receive data describing the service offered by the listing from a listing user, such as data describing the specific service being offered; a timeframe of its availability including one or more of the start date, end date, start time, and an end time; a price; a geographical location; images and description that characterize the service; and any other relevant information. For example, a listing offering an accommodation may include a description of the type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a listing user 106 to include additional information about the service, such as videos, photographs, and other media.

The geographical location associated with the listing identifies the region, complete address, neighborhood, city, and/or country in which the service is offered. The listing module 208 is also capable of converting one type of location information (e.g., mailing address) into another type of location information (e.g., country, state, city, and neighborhood) using externally available geographical map information.

The price of the listing is the amount of money a client user is requested to pay in order to complete a transaction for the listed service. The price may be specified as an amount of money per day, per week, per day, per month, and/or per season, or per another interval of time specified by the listing user. Additionally, the price may include additional charges such as cleaning fees, pet tees, service fees, and taxes, or the listing price may be listed separately from additional charges.

Each listing is represented in online marketplace system 124 by a listing object, which includes the listing information as provided by the listing user and a unique listing ID, both of which are stored in the listing store 218. Each listing object is also associated with the manager object for the listing user that posted the listing.

Each listing is associated with a number of listing features that describe the listing and/or service offered by the listing, which may be stored in the listing store 218 and associated with the corresponding listing object. For example, listing features that describe the provided services may include a price to purchase and/or reserve the provided service, one or more fees (e.g., cleaning fee, additional guest fee, etc.) associated with purchasing and/or reserving the provided service, discounts associated with the service, a number of bedrooms or beds, a percentage of time that the service is booked or occupied, a geographic location associated with the provided, service, etc. Listing features that describe the listing services may include a listing view (e.g., number of views by client users), a number of images included in the listing, an amount of descriptive data provided in the listing, a popularity rank of the listing, etc.

Each listing object has an associated listing calendar. The listing calendar stores the availability of the listing for each time interval in a time period (each of which may be thought of as an independent item of time-expiring inventory), as specified by the listing user or determined automatically (e.g., through a calendar import process). For example, a listing user may access the listing calendar for a listing, and manually indicate the time intervals for which the service offered by the listing is available for transaction by a client user, which time intervals are blocked as not available by the listing user, and which time intervals are already in transaction (e.g., booked) for a client user. In addition, the listing calendar continues to store historical information as to the availability of the listing identifying which past time intervals were booked by client users, blocked, or available. Further, the listing calendar may include calendar rules (e.g., the minimum and maximum number of nights allowed for the inventory, a minimum or maximum number of nights needed between bookings, a minimum or maximum number of people allowed for the inventory, etc.). Information from each listing calendar is stored in the listing store 218.

Figure 3:
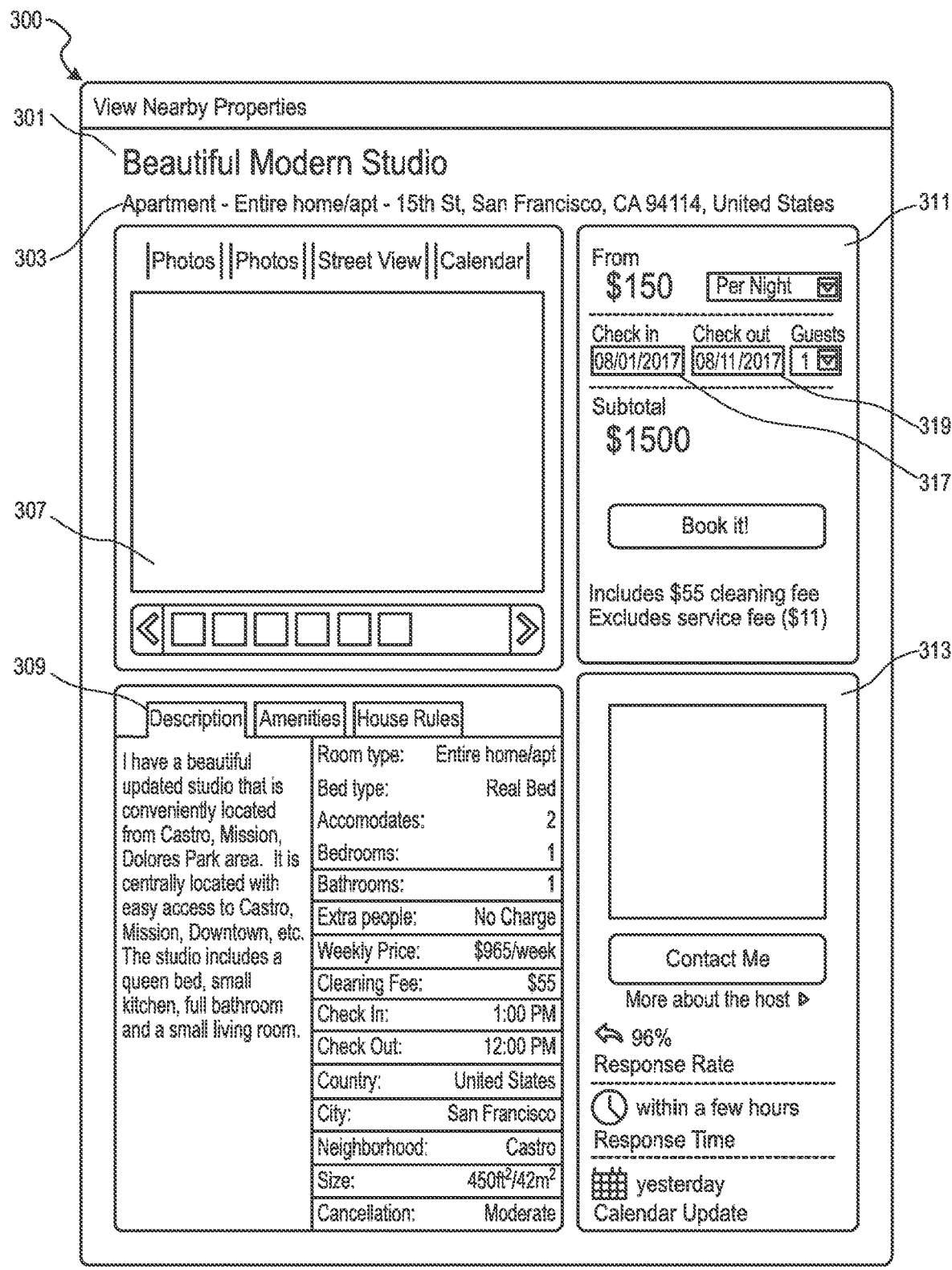
FIG. 3 illustrates an example user interface displaying an example listing for an offered service, according to some example embodiments.

FIG. 3 illustrates an example user interface 300 for a description of a listing for an offered service (e.g., an apartment in San Francisco) posted to an online marketplace. The example listing shown in FIG. 3 is for accommodation services in San Francisco. In other examples, the listing could be for services such as a tour, local experience, transportation, or other service. The listing may include a title 301 and a brief description 303 of the service. The listing may further include photos of the service, maps of the area or location associated with the service, a street view of the service, a calendar of the service, and so forth, which may be viewed in area 307. The listing may include a detailed description 309, pricing information 311, and the listing user's information 313. The listing may further allow a client user to select a date range for booking the service by entering or choosing specific check-in date 317 and check-out date 319.

Returning to FIG. 2, the search system 210 comprises program code configured to enable client users to search listings posted to the online marketplace based on search parameters provided by the client users. This functionality aids client users in finding listings that are relevant to the client user's needs. For example, a client user may provide search parameters such as defining a particular location for the services (e.g., San Francisco), desired dates that the service is needed (e.g., 6/10-6/17), the type of service needed (e.g., house rental, car rental, tour), a desired price range for the services, and so forth. The search system 210 uses the provided search parameters to execute a search query of the listing store in which the search system 210 identifies listings posted to the online marketplace that meet the client user's provided search parameters. For example, the search system 210 may identify listings providing services that are within the specified geographic location, are offered within the specified price range, include a specified number of rooms, and so forth.

Search queries are saved as query objects stored by the online marketplace system 124 in the query store 220. For example, data associated with the search query, such as its search query features may be stored in the query store 220 and associated with the query object. Each search query is associated with a number of query features that describe the search query and/or the client user that caused the search query. For example, the query features may include the search parameters of the search query, such as a specified, location, price range, dates, type of service, etc. The query features may also include data stored in the client store 214 that describes the client user. For example, the query features may include such the location, age, sex, income, and so forth, of the client user, as well as historical purchase and/or reservation data of the client user, such as data describing previous listings that the client user purchased and/or reserved (e.g., price ranges, listing features).

In addition to the query features of the search query, data describing the listings identified as a result of the search query, the listings selected by the client user, the listing not selected by the client user, and so forth, may also be stored in the query store 220 and associated with the query object. For example, upon a client user providing input selecting a listing to more carefully review for possible transaction, the search system 210 records the selection in the query store 220.

The search system 210 ranks the listings identified by a search query of the listing store 218 based on an estimated relevance of the identified listings to the client user. For example, the search system 210 may rank the listings such that the listings estimated to be of higher relevance to the client user are listed higher in the ranking, whereas the listings estimated to be of lower relevance to the client user are listed lower in the ranking. The online marketplace system 124 may present the identified listings to the client user based on the ranking. As a result, the listings that are estimated to be of higher relevance to the client user will be presented before listings estimated to be of lower relevance to the requesting user.

One technical issue with ranking listings is how to properly account for varying query features. In many cases, determining the relevancy of a listing may vary based on the selected geographic region, the selected date, the client user, etc. For example, the cost associated with an acceptable accommodation (e.g., hotel room, apartment) varies based on the geographic region and the selected dates. In a high value market, such as Paris or New York, the cost for an acceptable accommodation is much higher than in a low value market such as the Philippines. Likewise, the cost of an acceptable accommodation varies based on whether it is a high season or low season.

Current systems often use a single algorithm when determining the relevancy of listings, regardless of variations in the query features. For example, a search algorithm may be configured to assign higher relevancy to cheaper listings (e.g., listings with a lower price) or listings in a specified price range, without considering the geographic region or dates selected. Accordingly, listings for accommodations that are not likely acceptable to the client user may be ranked higher and presented prior to accommodations that would be acceptable to the client user.

To alleviate these issues, the search system 210 uses a combination of a query feature machine learning model and a listing feature machine learning model to rank the listings identified by a search query. The query feature machine learning model generates a target vector based on query features of a search query. The target vector represents an estimated optimal search listing for the specific search query. The listing feature machine learning model generates a listing vector based on listing features of a listing. The listing vector represents the listing associated with the listing features.

To determine the ranking of a set of listings identified for a given search query, the search system 210 determines how similar each listing is to the estimated optimal listing for the search query. To accomplish this, the search system 210 uses the query features of the search query as input into the query feature machine learning model to generate a target vector representing the estimated optimal listing for the search query. The search system 210 also generates listing vectors representing the listings identified by the search query. For example, the search system 210 uses the listing features of each listing as input into the listing feature machine learning model.

The search system 210 determines how similar a listing is to the optimal listing for the search query based on the distance (e.g., Euclidian distance) between the listing vector representing the listing and the target vector representing the estimated optimal listing for the search query. Listing vectors that are close to the target vector (e.g., the distance between the listing vector and the target vector is relatively short) represent listings that are similar to the optimal listing. Conversely, listing vectors that are far from the target vector (e.g., the distance between the listing vector and the target vector is relatively long) represent listings that are not similar to the optimal listing.

The search system 210 ranks the listings based on the distances of the corresponding listing vectors to the target vector such that the listings corresponding to listing vectors that are closer to the target vector are ranked higher than the listings corresponding to listing vectors that are farther from the target vector. Accordingly, listings determined to be similar to the estimated optimal listing for the search query are ranked higher and presented to the client user prior to listings determined to be less similar to the estimated optimal listing for the search query.

The transaction module 212 comprises program code configured to enable client users to purchase, book, or reserve services provided by a listing. In operation, the transaction module 212 receives a transaction request from a client to book the offered service. A transaction request may be a standardized request form that is sent by the client user's client device 110, and which may be either modified, accepted or denying by the listing user. Modifications to a received request may include, for example, changing the date, price, or time/date range requested by the client user.

If the listing user accepts the request (or the client user accepts the proposed alternative), then the transaction module 212 updates an acceptance status associated with the request and the listing to indicate that the request was accepted. The client calendar and the listing calendar are also updated to reflect that the service offered by the listing has been transacted on for a particular time interval. Other modules not specifically described herein allow the client user to complete payment and the manager to receive payment.

The transaction module 212 may further comprise code configured to enable client users to instantly book services offered by a listing, whereby the online marketplace system 124 books or reserves the service upon receipt of the request from the client user.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide listing users and client users with the ability to exchange informal requests to transact. Informal requests are not sufficient to be binding upon the client user or listing user if accepted, and in terms of content, may vary from mere communications and general inquiries regarding the availability of inventory, to requests that fall just short of whatever specific requirements the online marketplace system 124 sets forth for formal transaction requests. The transaction module 212 may also store informal requests in the transaction store 222, as both informal and formal requests provide useful information about the demand for the listed services.

The booking session store 224 stores booking session data for all booking sessions performed by client users. Booking session data may include details about a listing that was booked and data about one or more other listings that were viewed (or seriously considered) but not booked by the client user before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Figure 4:
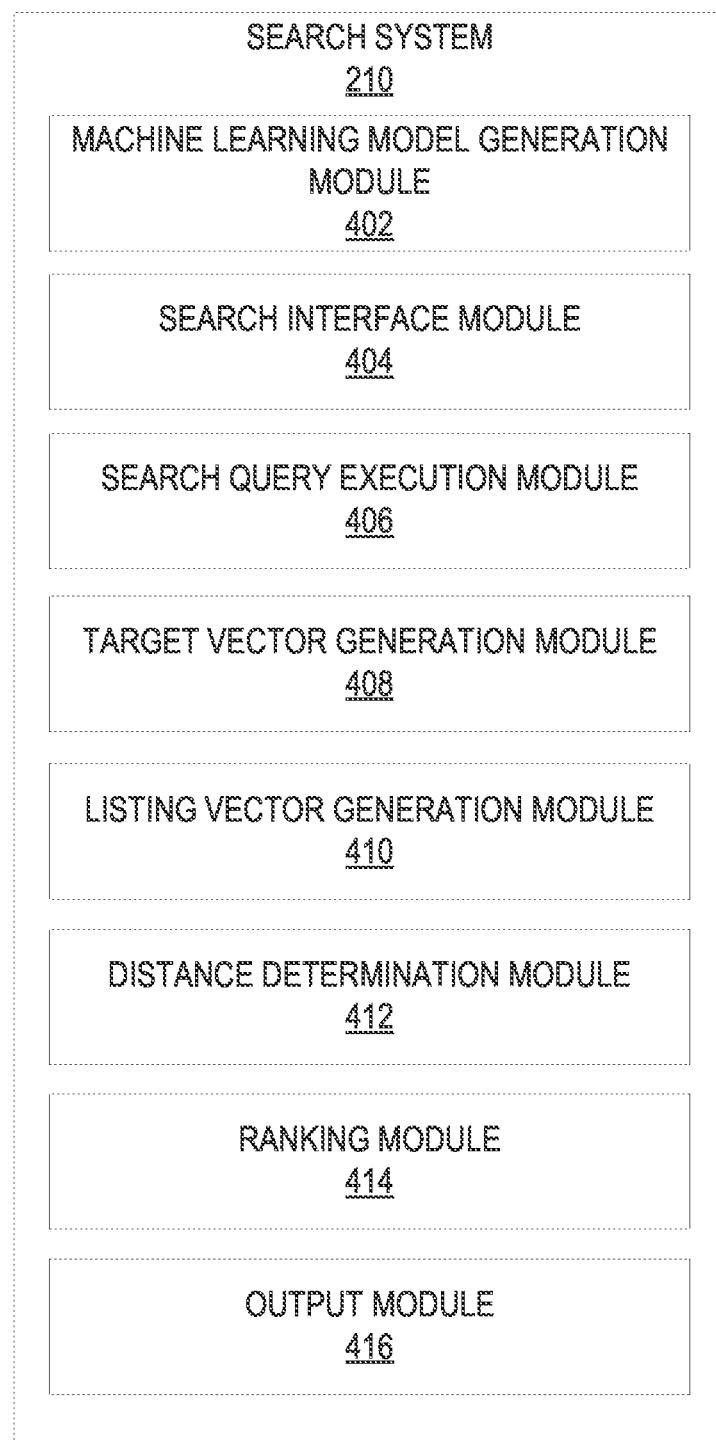
FIG. 4 is a block diagram illustrating a search system, according to some example embodiments.

FIG. 4 is a block diagram illustrating a search system 210, according to some example embodiments. The search system 210 comprises a machine learning model generation module 402, a search interface module 404, a search query execution module 406, a target vector generation module 408, a listing vector generation module 410, a distance determination module 412, a ranking module 414, and an output module 416.

The search system 210 may be implemented using a single computing device or a network of computing devices, including cloud-based computer implementations. The computing devices may be server-class computers including one or more high-performance computer processors and random-access memory, which may run an operating system such as Linux or the like. The operations of the search system 210 may be controlled either through hardware or through computer programs installed in non-transitory computer-readable storage devices such as solid-state devices or magnetic storage devices and executed by the processors to perform the functions described herein.

The machine learning model generation module 402 generates both a query feature machine learning model and a listing feature machine learning model. The query feature machine learning model and the listing feature machine learning model are used by the search system 210 to rank the listings identified by a search query. The query feature machine learning model generates a target vector that represents an optimal listing for a given search query. The query feature machine learning model generates the target vector based on query features of the search query. That is, the query feature machine learning model receives query features of the search query as input and outputs the target vector based on the received input. In contrast, the listing feature machine learning model generates a listing vector representing a listing identified for the search query. The listing feature machine learning model generates a listing vector based on listing features of the listing. That is, the listing feature machine learning model receives listing features of a listing as input and outputs a listing vector based on the received input. Use of the target vector and the listing vectors to rank search listings is described below.

The machine learning model generation module 402 generates the query feature machine learning model using any suitable machine learning algorithm, such as a neural network. The machine learning model generation module 402 trains the query feature machine learning model using query features of historical search queries and listing features of selected listings of the historical search queries. A selected listing is a listing presented to a client user as a result of a search query that the client user booked, reserved, or purchased. Accordingly, each historical search query may be associated with only one selected listing. The machine learning model generation module 402 gathers the training data to train the query feature machine learning model from the databases 126, such as the query store 220 and transaction store 222.

The machine learning model generation module 402 generates the listing feature machine learning model using two identical neural networks. The machine learning model generation module 402 trains the neural networks of the listing feature machine learning model using target vectors generated by the query feature machine learning model based on query features of historical search queries and listing features for the selected listings and the unselected listings of the historical search queries. In contrast to a selected search listing, an unselected search listing is a listing that was presented to the client user as part of a search query that the client user did not book, reserve, or purchase as a result of the search query. Accordingly, each historical search query may be associated with multiple unselected listings. The machine learning model generation module 402 gathers the training data to train the query feature machine learning model from the databases 126, such as the query store 220 and transaction store 222.

The machine learning model generation module 402 trains one of the neural networks of the listing feature machine learning model based on the listing features of the selected listings and trains the other neural network of the listing feature machine learning model based on the listing features of the unselected listings. The machine learning model generation module 402 uses target vectors generated by the query feature machine learning model based on the query features of the historical search queries to adjust the weights associated with the two neural networks of the listing feature machine learning model. For example, the machine learning model generation module 402 uses a historical search query and its corresponding pair of a selected listing and unselected listings to generate a query vector, a listing vector representing the selected listing and a query vector represented the unselected listing. The machine learning model generation module 402 then determines distances between the target vector and each listing vector. The machine learning model generation module 402 adjusts the weights of the two neural networks to push the listing vector representing the selected listing closer to the target vector, while also pushing the listing vector representing the unselected listing farther from the target vector. The machine learning model generation module 402 may repeat this process until the listing vectors representing the selected listings are always closer in distance to the target vector than the listing vector representing the unselected listings.

The search interface module 404 provides a search user interface that enables users to provide search parameters for a search query and to initiate the search query based on the provided search parameters. For example, the search user interface may include user interface elements, such as buttons text boxes, and the like, that a user may use to provide desired search parameters for the search query, such as selecting a location, price range, keyword, dates, and so forth. The search user interface may also include a selected button that the client user may select to initiate the search query based on the provided search parameters.

The search query execution module 406 executes a search query based on the search parameters provided by the client user. For example, the search query execution module 406 searches listings stored in the listing store 218 based on the search parameters to identify listings that meet the provided search parameters. That is, the search query execution module 406 identifies listings that are located within a specified location, have a price within a specified price range, are available during a specified period of time, include a specified number of rooms, and so forth, as specified by the search parameters.

The target vector generation module 408 generates a target vector based on query features of the search query. Each search query is associated with a number of query features that describe the search query and/or the client user that caused execution of the search query. For example, the query features may include the search parameters of the search query, such as a specified, location, price range, dates, type of service, and so forth. The query features may also include data describing the client user, such as the location, age, sex, income, and so forth, of the client user, as well as historical purchase and/or reservation data of the client user, such as data describing previous listings that the client user purchased and/or reserved (e.g., price ranges, listing features). The target vector generation module 408 gathers the query features from the search query parameters and/or the client store 214.

The target vector generation module 408 uses the gathered query features as input into the query feature machine learning model. The query feature machine learning model outputs the target vector for the search query based on the provided query features. The target vector represents an estimated optimal listing for the search query.

The listing vector generation module 410 generates a listing vector based on listing features of a listing identifies as part of a search query. Each listing posted to the online marketplace is associated with a number of listing features that describe the listing and/or service offered by the listing. For example, listing features that describe the provided services may include a price to purchase and/or reserve the provided service, one or more fees (e.g., cleaning fee, additional guest fee) associated with purchasing and/or reserving the provided service, discounts associated with the service, a number of bedrooms or beds, a percentage of time that the service is booked or occupied, a geographic location associated with the provided, service, and so forth. Listing features that describe the listing services may include a listing view (e.g., number of views by client users), a number of images included in the listing, an amount of descriptive data provided in the listing, a popularity rank of the listing, and so forth.

The listing vector generation module 410 gathers the listing features for a listing from the listing store 218 and uses the listing features as input into the listing feature machine learning model. In turn, the listing feature machine model uses the provided listing features to generate a listing vector that represents the listing. The listing vector generation module 410 may repeat this process, either sequentially or concurrently, for each listing identified as part of a search query. This results in a set of listing vectors that represent the listings identified for the search query.

The distance determination module 412 determines the distance between a listing vector and a target vector. The distance the distance between the listing vector and the target vector in Euclidian space. The distance determination module 412 may use any suitable algorithm to determine the distance between the listing vector and the target vector, such as by determining the straight-line distance (e.g., Euclidian distance) between the vectors. The distance determination module 412 may repeat this process for each listing vector generated for a search query. That is the distance determination module 412 may determine a distance between the target vector for a search query and the listing vectors for each listing identified as part of the search query.

The ranking module 414 ranks the listing for a search query based on the distances determined by the distance determination module 412. The distance between a target vector and a listing vector indicates how similar the listing represented by the listing vector is the estimated optimal listing for the search query. For example, listings represented by listing vectors that are a short distance from the target vector are assumed to be more similar to the optimal listing than listings represented by listing vectors that are a farther distance from the target vector. The ranking module 414 may rank the listings according the distances of their representative listing vectors to the target vector such that listings represented by listing vectors that are shorter distances from the target vector are ranked higher than listings represented by listing vectors that are longer distances from the target vector.

The output module 416 returns the listings identified for a search query and the ranking of the listings in response to a search query. The listings may be presented according to the ranking to a client user on a display of the client user's client device 110. Accordingly, the client user will be presented with the highest ranked listings first.

Figure 5:
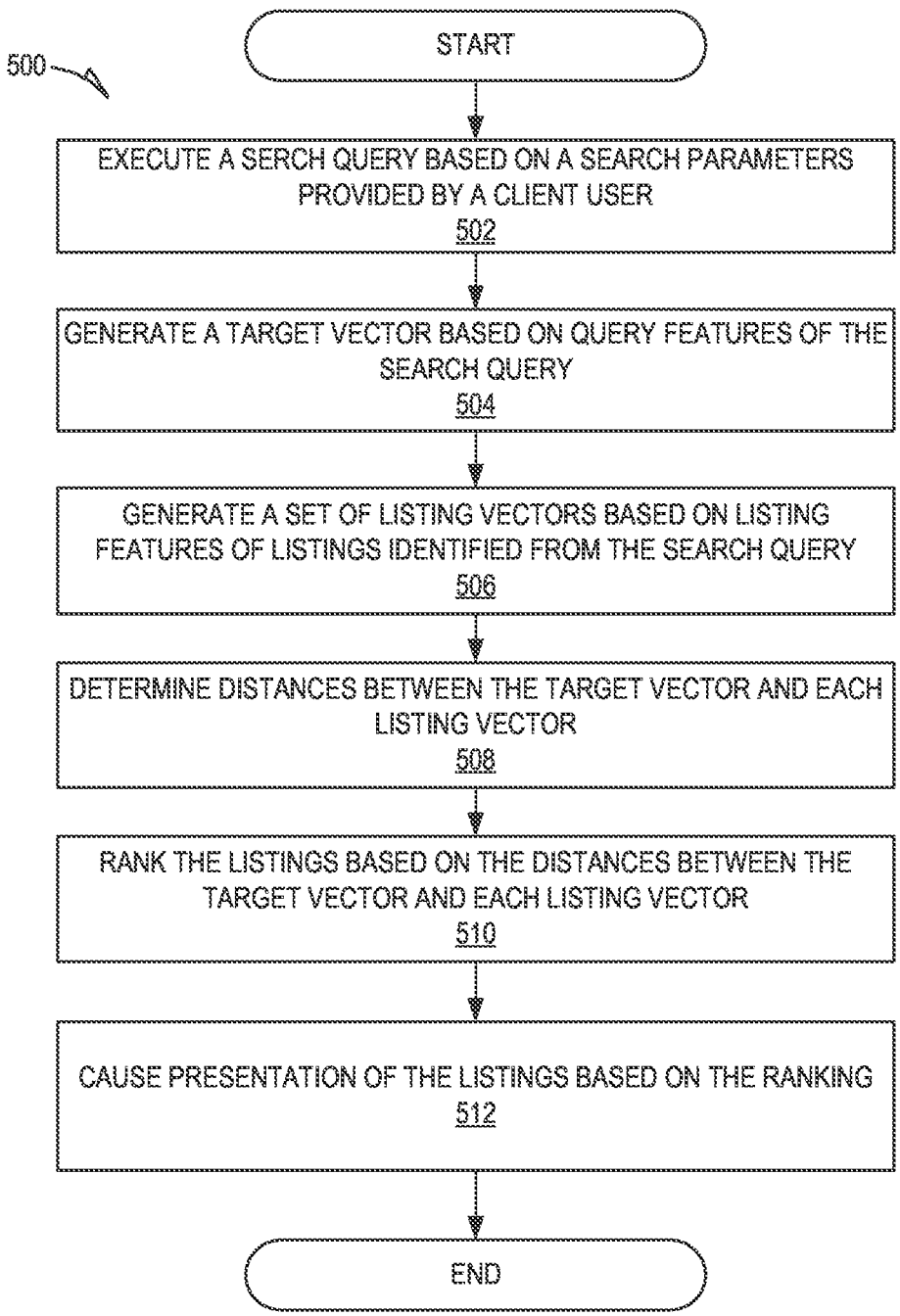
FIG. 5 is a flowchart illustrating aspects of a method for search result optimization using machine learning models, according to some example embodiments.

FIG. 5 is a flowchart illustrating aspects of a method 500 for search result optimization using machine learning models, according to some example embodiments. For illustrative purposes, the method 500 is described with respect to the networked system 100 of FIG. 1, the online marketplace system 124 of FIG. 2, and search system 210 of FIG. 4. It is to be understood that the method 500 may be practiced with other system configurations in other embodiments.

At operation 502, the search query execution module 406 executes a search query based on search parameters provided by a client user. Search parameters are parameters that define the scope of a search, such as a selected location, price range, keyword, dates, and so forth. A client user may use a search interface to enter search parameters and cause execution of a search query based on the provided search parameters.

The search query execution module 406 executes the search query based on the search parameters provided by the client user. For example, the search query execution module 406 searches listings stored in the listing store 218 based on the search parameters to identify listings that meet the provided search parameters. That is, the search query execution module 406 identifies listings that are located within a specified location, have a price within a specified price range, are available during a specified period of time, include a specified number of rooms, and so forth, as specified by the search parameters At operation 504, the target vector generation module 408 generates a target vector based on query features of the search query. Each search query is associated with a number of query features that describe the search query and/or the client user that caused execution of the search query. For example, the query features may include the search parameters of the search query, such as a specified, location, price range, dates, type of service, and so forth. The query features may also include data describing the client user, such as the location, age, sex, income, and so forth, of the client user, as well as historical purchase and/or reservation data of the client user, such as data describing previous listings that the client user purchased and/or reserved (e.g., price ranges, listing features). The target vector generation module 408 gathers the query features from the search query parameters and/or the client store 214.

The target vector generation module 408 uses the gathered query features as input into the query feature machine learning model. The query feature machine learning model outputs the target vector for the search query based on the provided query features. The target vector represents an estimated optimal listing for the search query.

At operation 506, the listing vector generation module 410 generates a set of listing vectors based on listing features of listings identified from the search query. Each listing posted to the online marketplace is associated with a number of listing features that describe the listing and/or service offered by the listing. For example, listing features that describe the provided services may include a price to purchase and/or reserve the provided service, one or more fees (e.g., cleaning fee, additional guest fee, etc.) associated with purchasing and/or reserving the provided service, discounts associated with the service, a number of bedrooms or beds, a percentage of time that the service is booked or occupied, a geographic location associated with the provided, service, and so forth. Listing features that describe the listing services may include a listing view (e.g., number of views by client users), a number of images included in the listing, an amount of descriptive data provided in the listing, a popularity rank of the listing, and so forth.

The listing vector generation module 410 gathers the listing features for a listing from the listing store 218 and uses the listing features as input into the listing feature machine learning model. In turn, the listing feature machine model uses the provided listing features to generate a listing vector that represents the listing. The listing vector generation module 410 may repeat this process, either sequentially or concurrently, for each listing identified as part of a search query. This results in a set of listing vectors that represent the listings identified for the search query.

At operation 508, the distance determination module 412 determines distances between the target vector and each listing vector. The distance determination module 412 determines the distance between a listing vector and a target vector in Euclidian space. The distance determination module 412 may use any suitable algorithm to determine the distance between the listing vector and the target vector, such as by determining the straight-line distance (e.g., Euclidian distance) between the vectors. The distance determination module 412 may repeat this process for each listing vector generated for a search query. That is the distance determination module 412 may determine a distance between the target vector for a search query and each listing vectors for each listing identified as part of the search query.

At operation 510, the ranking module 414 ranks the listing based on the distances between the target vector and each listing vector. The distance between a target vector and a listing vector indicates how similar the listing represented by the listing vector is the estimated optimal listing for the search query. For example, listings represented by listing vectors that are a short distance from the target vector are assumed to be more similar to the optimal listing than listings represented by listing vectors that are a farther distance from the target vector. The ranking module 414 may rank the listings according the distances of their representative listing vectors to the target vector, such that listings represented by listing vectors that are shorter distances from the target vector are ranked higher than listings represented by listing vectors that are longer distances from the target vector At operation 512, the output module 416 causes presentation of the listing based on the ranking. The output module 416 returns the listings identified for a search query and the ranking of the listings in response to a search query. The listings may be presented according to the ranking to a client user on a display of the client user's client device 110. Accordingly, the client user will be presented with the highest ranked listings first.

Software Architecture

Figure 6:
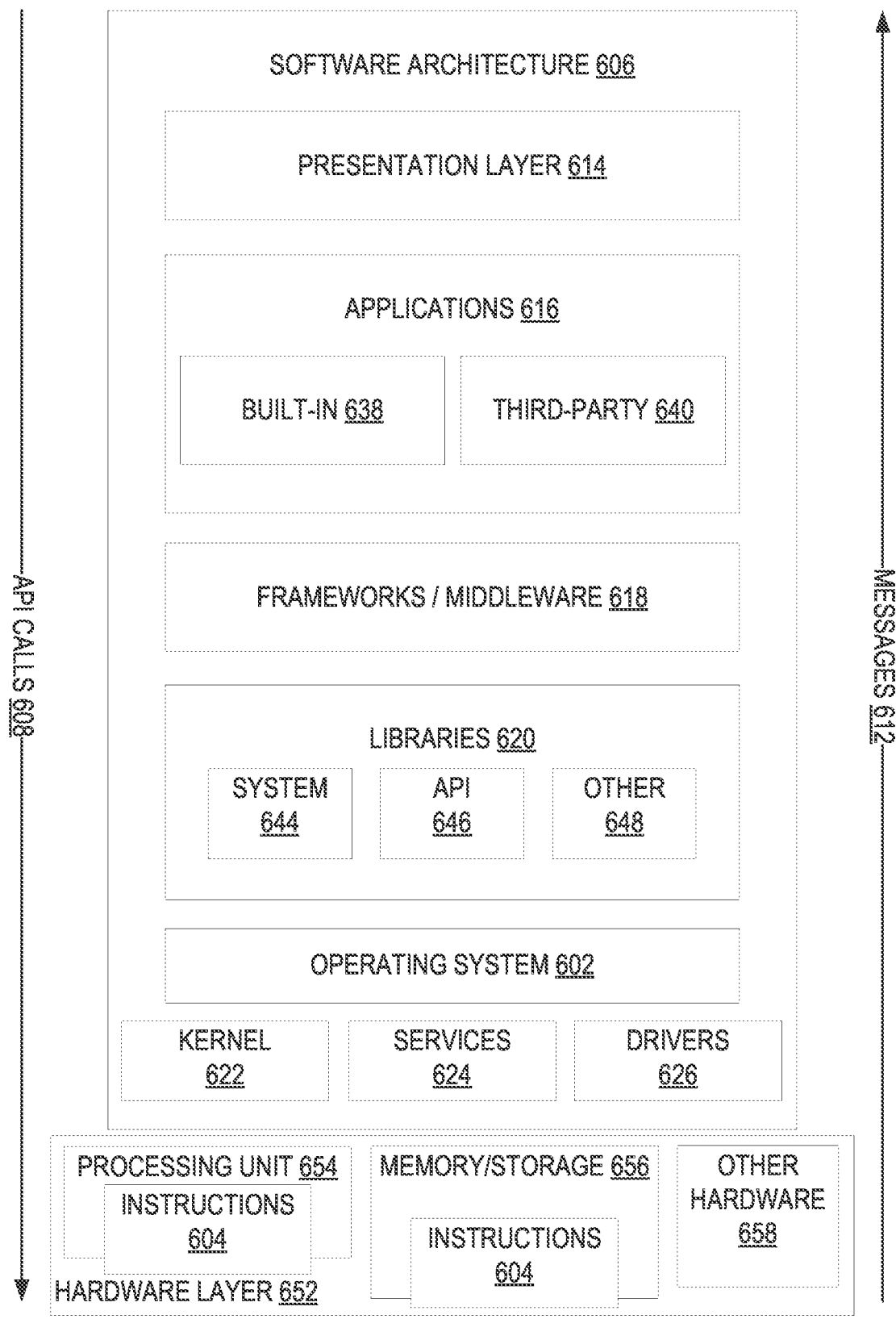
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
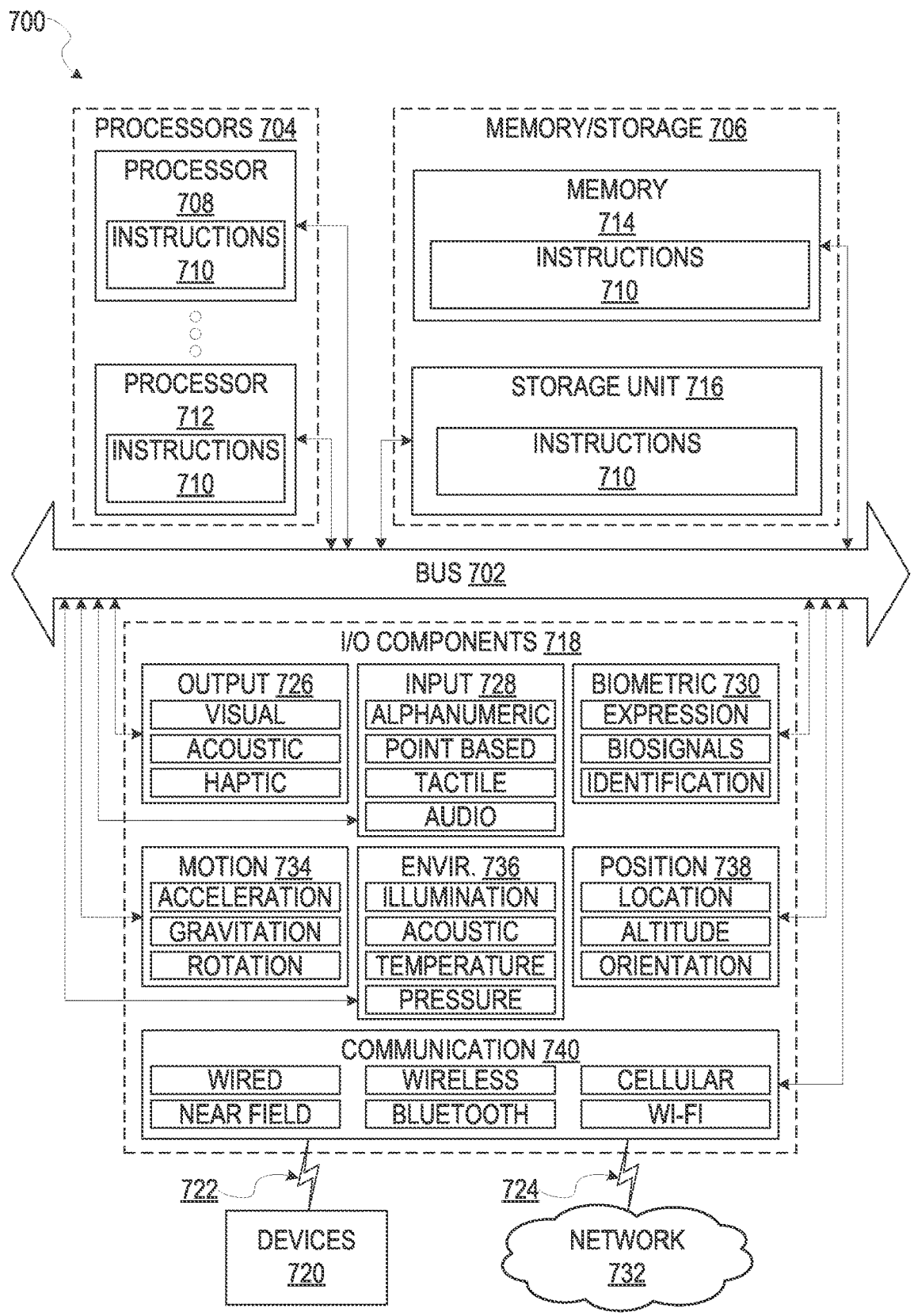
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 71$ are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method comprising:
generating a target vector representing an optimal listing to a search query;
generating, using an individual machine learning model, a first listing vector representing a first listing identified based on the search query, and a second listing vector representing a second listing identified based on the search query;
measuring a first Euclidian distance indicating a first measure of similarity between the first listing vector and the target vector;
measuring a second Euclidian distance indicating a second measure of similarity between the second listing vector and the target vector; and
ranking the first listing and the second listing based on the first Euclidian distance indicating the first measure of similarity and the second Euclidian distance indicating the second measure of similarity.

2. The method of claim 1, further comprising:
receiving, from a client device, data defining the search query;
identifying a set of listings based on the search query, the set of listings including the first listing and the second listing; and
causing presentation of at least a subset of the set of listings in a display of the client device based on the ranking.

3. The method of claim 1, further comprising:
generating a first machine learning model based on query features of historical search queries and listing features of selected listings of the historical search queries.

4. The method of claim 3, wherein the individual machine learning model is a second machine learning model, further comprising:
generating the second machine learning model based on target vectors generated by the first machine learning model for the historical search queries, listing features of the selected listings of the historical search queries, and listing features of unselected listings of the historical search queries.

5. The method of claim 4, wherein the second machine learning model includes a first neural network and a second neural network, and generating the second machine learning model comprises:
generating, based on listing features of a first selected listing, a selected listing vector representing the first selected listing, the selected listing vector generated using the first neural network, the first selected listing corresponding to a first historical search query;
generating, based on listing features of a first set of unselected listings, an unselected listing vector representing the first set of unselected listings, the unselected listing vector generated using the second neural network, the first set of unselected listings corresponding to the first historical search query;
generating, based on query features of the first historical search query, a training target vector representing an estimated optimal listing for the first historical search query, the training target vector generated using a first machine learning model;

determining a first training distance measured between the selected listing vector and the training target vector;

determining a second training distance measured between the unselected listing vector and the training target vector; and adjusting weights of the first neural network and the second neural network based on the first training distance and the second training distance.

6. The method of claim 5, wherein adjusting weights of the first neural network and the second neural network comprises:

determining that the first training distance is longer than the first training distance; and adjusting the weights of the first neural network and the second neural network to result in a subsequent iteration of the first training distance being shorter than a subsequent iteration of the second training distance.

7. The method of claim 1, wherein ranking the first listing and the second listing comprises:

determining that a first distance between the first listing vector and the target vector is shorter than a second distance between the second listing vector and the target vector; and ranking the first listing higher than the second listing based on determining that the first distance is shorter than the second distance.

8. A system comprising:

one or more computer processors; and one or more computer-readable mediums storing instructions that, when executed by the one or more computer processors, cause the system to perform operations comprising:

generating a target vector representing an optimal listing to a search query;

generating, using an individual machine learning model, a first listing vector representing a first listing identified based on the search query, and a second listing vector representing a second listing identified based on the search query;

measuring a first Euclidian distance indicating a first measure of similarity between the first listing vector and the target vector;

measuring a second Euclidian distance indicating a second measure of similarity between the second listing vector and the target vector; and ranking the first listing and the second listing based on the first Euclidian distance indicating the first measure of similarity and the second Euclidian distance indicating the second measure of similarity.

9. The system of claim 8, wherein the individual machine learning model is generated based on target vectors generated by a first machine learning model for historical search queries, listing features of selected listings of the historical search queries, and listing features of unselected listings of the historical search queries.

10. The system of claim 8, the operations further comprising:

generating a first machine learning model based on query features of historical search queries and listing features of selected listings of the historical search queries.

11. The system of claim 10, wherein the individual machine learning model comprises a second machine learning model, the operations further comprising:

generating the second machine learning model based on target vectors generated by the first machine learning model for the historical search queries, listing features of the selected listings of the historical search queries, and listing features of unselected listings of the historical search queries.

12. The system of claim 11, wherein the second machine learning model includes a first neural network and a second neural network, and generating the second machine learning model comprises:

generating, based on listing features of a first selected listing, a selected listing vector representing the first selected listing, the selected listing vector generated using the first neural network, the first selected listing corresponding to a first historical search query;

generating, based on listing features of a first set of unselected listings, an unselected listing vector representing the first set of unselected listings, the unselected listing vector generated using the second neural network, the first set of unselected listings corresponding to the first historical search query;

generating, based on query features of the first historical search query, a training target vector representing an estimated optimal listing for the first historical search query, the training target vector generated using a first machine learning model;

determining a first training distance measured between the selected listing vector and the training target vector;

determining a second training distance measured between the unselected listing vector and the training target vector; and adjusting weights of the first neural network and the second neural network based on the first training distance and the second training distance.

13. The system of claim 12, wherein adjusting weights of the first neural network and the second neural network comprises:

determining that the first training distance is longer than the first training distance; and adjusting the weights of the first neural network and the second neural network to result in a subsequent iteration of the first training distance being shorter than a subsequent iteration of the second training distance.

14. The system of claim 8, wherein ranking the first listing and the second listing comprises:

determining that a first distance between the first listing vector and the target vector is shorter than a second distance between the second listing vector and the target vector; and ranking the first listing higher than the second listing based on determining that the first distance is shorter than the second distance.

15. A non-transitory computer-readable medium storing instructions that, when executed by one or more computer processors of one or more computing devices, cause the one or more computing devices to perform operations comprising:

generating a target vector representing an optimal listing to a search query;

generating, using an individual machine learning model, a first listing vector representing a first listing identified based on the search query, and a second listing vector representing a second listing identified based on the search query;

measuring a first Euclidian distance indicating a first measure of similarity between the first listing vector and the target vector;

measuring a second Euclidian distance indicating a second measure of similarity between the second listing vector and the target vector; and ranking the first listing and the second listing based on the first Euclidian distance indicating the first measure of similarity and the second Euclidian distance indicating the second measure of similarity.

16. The non-transitory computer-readable medium of claim 15, the operations further comprising:
receiving, from a client device, data defining the search query;
identifying a set of listings based on the search query, the set of listings including the first listing and the second listing; and
causing presentation of at least a subset of the set of listings in a display of the client device based on the ranking.

17. The non-transitory computer-readable medium of claim 15, the operations further comprising:
generating a first machine learning model based on query features of historical search queries and listing features of selected listings of the historical search queries.

18. The non-transitory computer-readable medium of claim 17, wherein the individual machine learning model comprises a second machine learning model, the operations further comprising:
generating the second machine learning model based on target vectors generated by the first machine learning model for the historical search queries, listing features of the selected listings of the historical search queries, and listing features of unselected listings of the historical search queries.

19. The non-transitory computer-readable medium of claim 18, wherein the second machine learning model includes a first neural network and a second neural network, and generating the second machine learning model comprises:
generating, based on listing features of a first selected listing, a selected listing vector representing the first selected listing, the selected listing vector generated using the first neural network, the first selected listing corresponding to a first historical search query;
generating, based on listing features of a first set of unselected listings, an unselected listing vector representing the first set of unselected listings, the unselected listing vector generated using the second neural network, the first set of unselected listings corresponding to the first historical search query;
generating, based on query features of the first historical search query, a training target vector representing an estimated optimal listing for the first historical search query, the training target vector generated using a first machine learning model;
determining a first training distance measured between the selected listing vector and the training target vector;
determining a second training distance measured between the unselected listing vector and the training target vector; and
adjusting weights of the first neural network and the second neural network based on the first training distance and the second training distance.

20. The non-transitory computer-readable medium of claim 15, wherein the target vector is generated using a first machine learning model.

* * * * *